Oct. 25, 1960     W. B. HERNDON ET AL     2,957,373
DUAL COUPLING SHIFT TRANSMISSION
Filed July 1, 1957                                               2 Sheets-Sheet 2

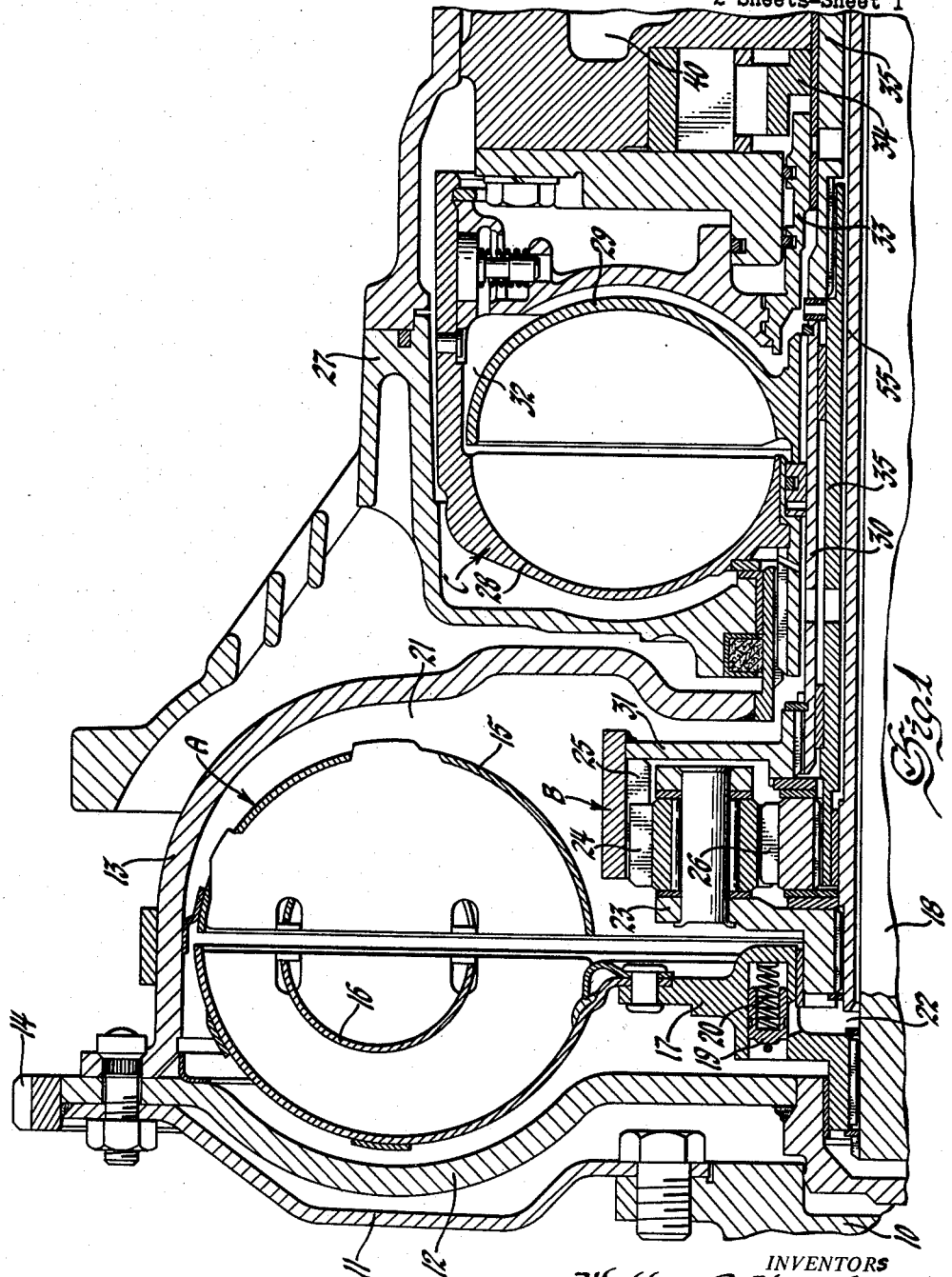

INVENTORS
Walter B. Herndon &
Victor C. Moore
BY
W. C. Middleton
ATTORNEY

United States Patent Office 2,957,373
Patented Oct. 25, 1960

2,957,373
DUAL COUPLING SHIFT TRANSMISSION

Walter B. Herndon, Ann Arbor, and Victor C. Moore, Plymouth, Mich., assignors to General Motors Corporation, Detroit, Mich., a corporation of Delaware Filed July 1, 1957, Ser. No. 669,069

13 Claims. (Cl. 74—732)

This invention relates to transmissions and more particularly to transmissions incorporating planetary gear units adapted to provide a plurality of drive ratios. The transmission provided herein includes a pair of hydrodynamic fluid coupling units operating in conjunction with the gearing units which, together with suitable brake and clutching mechanism may provide for neutral or no drive, three forward drive ratios, and reverse.

An object of this invention is to provide a plural speed transmission incorporating a pair of hydrodynamic torque transfer devices wherein each such device is provided with an impeller driven continuously at engine speed.

Another object of this invention is to provide a transmission of the step ratio type constructed and arranged to accomplish change of ratio smoothly and with minimum torque reaction "bumps" during transition from one drive ratio to another.

A further object of this invention is to provide a transmission of the type described having a pair of hydrodynamic torque transfer units each having an impeller continuously driven at engine speed and each having a turbine adapted to drive one element of a different gearing unit wherein drive is initially through one turbine, is later accomplished through a second turbine, and is finally again assumed by the first turbine.

An additional object of this invention is to provide a transmission of the type described adapted to provide a positive neutral, three forward drive ratios, and reverse.

A further object of this invention is to provide a transmission of the class described wherein first or low gear is accomplished through one hydrodynamic torque transfer device and one gear unit and wherein reverse is accomplished through the same hydrodynamic torque transfer device and gear unit in conjunction with a reverse gear unit.

Another object of this invention is to provide a transmission of the class described having manually controllable braking mechanism associated with the gear units for providing overrun engine braking.

Still another object of this invention is to provide a three-speed step ratio transmission which is smooth in operation and relatively inexpensive to manufacture and maintain.

These and other objects of this invention will be apparent from the following description and claims taken in conjunction with the following drawings in which:

Figure 1 is a sectional view of the front portion of the transmission.

Figure 1A:
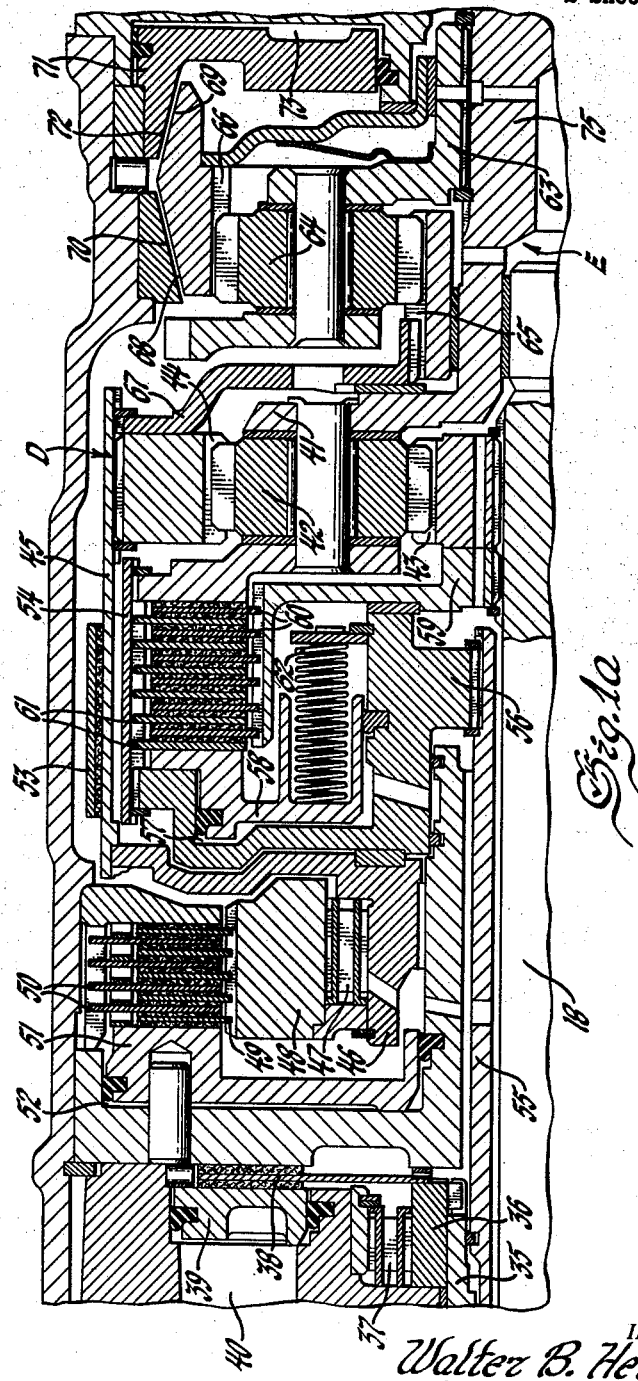
Figure 1a is a sectional view of the rear portion of the transmission.

Referring to the drawings there is shown an engine driven power input shaft 10 connected to drive a flywheel 12 by means of a flexible plate 11. A torus cover 13 is bolted to flywheel 12, there being a ring gear 14 on flywheel 12 for engine starting purposes. An impeller 15 of a fluid coupling unit A is secured to torus cover 13 to rotate therewith. A turbine 16 is supported by a hub 17 splined to a shaft 18 to rotate the shaft. Hub 17 carries a valve 19 biased by a spring 20 to block off a passage 22 from torus chamber 21 in which fluid is contained. Valve 19 acts to maintain a minimum pressure in chamber 21 and to prevent excess pressure therein. Working fluid such as oil, is permitted to pass through valve 19 for lubrication purposes whenever the pressure in chamber 21 exceeds a predetermined value.

Also disposed in chamber 21 is a planetary gearing unit B having a planet carrier 23 supporting a plurality of planet gears 24 in mesh with a ring gear 25 and a sun gear 26. Transmission case 27 encloses a second fluid coupling unit C having an impeller 28 rotatably driven by torus cover 13 and a turbine 29 drivingly connected to ring gear 25 by means of a sleeve shaft 30 and a drive plate 31. Thus turbine 29 and ring gear 25 are connected to each other for rotation as a unit. Fluid coupling chamber 32 may be alternately filled with working fluid and emptied of working fluid by action of suitable controls, not shown. A sleeve shaft 33 fixed for rotation with impeller 28 drives a pump 34 to supply fluid under pressure for transmission control purposes. Sun gear 26 is splined to a sleeve shaft 35 which in turn carries a race 36 of a one-way brake 37 effective to prevent reverse rotation of sun gear 26 when power is applied to ring gear 25 and to permit forward rotation of sun gear 26 under other conditions of operation. A two-way brake 38 fixed to race 36 may be applied by means of a piston 39 upon admission of fluid under pressure to a chamber 40 to prevent rotation of sun gear 26 either forwardly or reversely, when desired.

A second planetary gear unit D comprises a planet carrier 41 fixed to a power output shaft 75 to rotate the same and supporting a plurality of planet gears 42 in mesh with a sun gear 43 and a ring gear 44. Sun gear 43 is splined to shaft 18 for rotation as a unit with turbine 16. Ring gear 44 is fixed to a drum 45 carrying a race 46 of a one-way brake 47. A second race 48 of one-way brake 47 may be held against rotation by means of disc brakes 49–50 which may be engaged through action of a piston 51 upon admission of fluid under pressure to a chamber 52. Thus, ring gear 44 may be held against reverse rotation by means of one-way brake 47 when sun gear 43 is driven by turbine 16. A brake band 53 may be applied to drum 45 to prevent either forward or reverse rotation of ring gear 44. When disc brake 49–50 and brake band 53 are released, no torque may be transmitted through gear unit D.

Planet carrier 41 of gear unit D is fixed to a clutch drum 54, the drum 54 in turn being connected to planet carrier 23 by means of a sleeve shaft 55 and a member 56 shaped to form a piston chamber 57 having a piston 58 disposed therein. Thus the planet carriers 23 and 41 are drivingly connected to each other and to output shaft 75 for rotation as a unit. A clutch hub 59 splined to sleeve shaft 18 for rotation therewith carries a plurality of clutch plates 60 adapted to engage clutch plates 61 on clutch drum 54 when fluid pressure is admitted to chamber 57. A series of springs 62 function to release the clutch when chamber 57 is emptied of fluid.

A third gear unit E is employed to obtain reverse drive. Gear unit E comprises a planet carrier 63 splined to power delivery shaft 75 and supporting a plurality of planet gears 64 in mesh with a sun gear 65 and a ring gear 66. A drive plate 67 connects sun gear 65 to drum 45. Ring gear 66 is provided with cone surfaces 68 and 69. A conical backing member 70 is fixed to the transmission housing. A piston 71 is provided with a cone surface 72 adapted to brake ring gear 66 against rotation when fluid pressure is admitted to a chamber 73 adjacent piston 71.

Operation—Neutral

For positive neutral the brake 49–50 is released to render one-way brake 47 ineffective. Brake band 53 is released from drum 45. Fluid coupling unit C is empty. Turbine 29 is ineffective to rotate ring gear 25 of gear unit B. Turbine 16 rotates sun gear 43 of gear unit D. Since ring gear 44 merely rotates freely rearwardly, gear unit D has no reaction point and is unable to transmit torque to carrier 41 and shaft 75. The vehicle engine may be raced for engine warm up or other purposes without driving the vehicle.

Forward low

For forward low gear operation, brake 49—50 is applied and coupling C is empty of fluid. Drive is then from turbine 16 to sun gear 43 and planet carrier 41 of gear unit D.

Forward second

Second gear operation may be had by filling coupling C with working fluid. Turbine 29 thereupon drives ring gear 25 at substantially engine speed. Sun gear 26 is held against reverse rotation by means of one-way brake 37. Planet carrier 23 assumes the drive and transmits power to shaft 75 through sleeve shaft 55, member 56, drum 54 and planet carrier 41. Shaft 75 is, therefore, driven in second gear at an intermediate ratio. In second gear, ring gear 44 will overrun on its one-way brake 47.

Forward direct

For direct drive fluid coupling 29 remains filled with fluid and clutch 60—61 is engaged by piston 58 upon admission of fluid under pressure to chamber 57. Planet carrier 41 is thereby locked to sun gear 43 for direct drive of gear unit D. Clutch 60—61 may be subsequently released to provide a passing gear for rapid vehicle acceleration. In direct drive, torque is transmitted through turbine 16 and clutch 60—61, the sun gear 26 of gear unit B, being rotated forwardly.

Downhill braking

In hilly country it may be desirable to prevent the freewheeling which normally occurs under coast conditions due to action of one-way brakes 37 and 47. This freewheeling may be avoided by selectively applying two-way brakes 38 or 53 to prevent rotation of sun gear 26 and ring gear 44, respectively. With brake 38 or 53 applied, torque may be transmitted from shaft 75 through the gear units and couplings to engine shaft 10 for engine braking purposes.

Reverse

For reverse operation, coupling C is empty and fluid under pressure is admitted to chamber 73 to cause piston 71 to hold ring gear 66 of reverse gear unit E against rotation. Brake 49—50 and brake 53 are released. Turbine 16 drives sun gear 43 of gear unit D. Planet carrier 41 tends to remain stationary due to the load thereon. Ring gear 44 is rotated rearwardly by planet pinions 42, thereby rotating sun gear 65 of gear unit E reversely. Ring gear 66 is held against rotation so that planet carrier 63 and shaft 75 are rotated reversely in reduction through gear unit E.

The controls for admitting fluid under pressure to the various servos do not constitute a part of this invention and may be of standard construction. Band 53 may be actuated by a hydraulic servo (not shown) adapted to apply brake band 53 to drum 45 when fluid under pressure is admitted to the servo.

It will be understood from the foregoing description that in low gear, drive is by way of turbine 16 and gear unit D. In second speed, drive is by turbine 29 and gear unit B. In direct, drive is by turbine 16 and clutch 60—61. In reverse, drive is by turbine 16, gear unit D and gear unit E. For overrun braking, a selected one of the two-way brakes 38 and 53 is applied to provide reduction drive through the gear unit associated with the applied brake. For passing with rapid acceleration, a downshift from direct to second gear drive may be had simply by releasing clutch 60—61.

The transmission is extremely smooth in operation due to the slip characteristics of the coupling units. It will be understood that while fluid couplings are illustrated, other hydrodynamic torque transfer mechanisms such as, for example, torque converters may be employed, if desired. In shifting from first to second drive ratio, coupling C gradually and smoothly picks up the load without shock as it is being filled with working fluid. Any shock which might arise due to engagement of clutch 60—61 is absorbed partially in each fluid coupling unit so that a smooth shift from second to high is accomplished.

What is claimed is:

1. In a transmission, an engine driven shaft, a power output shaft, a first hydrodynamic torque transfer device and a first planetary gearing unit adapted to drive said power output shaft in first forward gear drive ratio, said first planetary gearing unit including a planet carrier fixed for rotation with said power output shaft, a second hydrodynamic torque transfer device adapted to be filled with working fluid and emptied of working fluid, a second planetary gearing unit including a planet carrier, said second hydrodynamic torque transfer device and said second planetary gearing unit being effective to drive said power output shaft in intermediate forward drive ratio when said second hydrodynamic torque transfer device is filled with working fluid, a clutch adapted to be engaged and disengaged and effective to lock up said first planetary gearing unit when engaged, said clutch including a clutch drum for connecting the planet carrier of said second gear unit to the planet carrier of the first gear unit for rotation therewith, said first hydrodynamic torque transfer device and said clutch constituting the power train for forward direct drive of said power output shaft when said clutch is engaged.

2. In a transmission, an engine driven shaft, a power output shaft, a first hydrodynamic torque transfer device including an impeller driven by said engine driven shaft and a turbine, a planetary gearing unit driven by said turbine and including a planet carrier for driving said power output shaft in first forward gear drive ratio, a second hydrodynamic torque transfer device adapted to be filled with and emptied of working fluid including an impeller driven by said engine driven shaft and a turbine, a second planetary gearing unit driven by said second-mentioned turbine and including a planet carrier for driving said power output shaft in intermediate forward drive ratio when said second hydrodynamic torque transfer device is filled with working fluid, and a clutch adapted to be engaged and disengaged and effective to lock up said first-mentioned planetary gearing unit in direct forward drive when engaged, said clutch including a clutch drum for connecting the planet carriers of said first and second gear units to each other for rotation as a unit, said first-mentioned hydrodynamic torque transfer device and said clutch constituting the power train for direct drive of said power output shaft when said clutch is engaged.

3. In a transmission, an engine driven shaft, a power output shaft, a first fluid coupling device including an impeller driven directly by said engine driven shaft and a turbine, a planetary gearing unit driven by said turbine for driving said power output shaft in low gear forward drive ratio, said planetary gearing unit having a planet carrier fixed for rotation with said power output shaft, a second fluid coupling device adapted to be filled with and emptied of working fluid including an impeller driven directly by said engine driven shaft and a turbine, a second planetary gearing unit driven by said second-mentioned turbine for driving said power output shaft in intermediate forward drive ratio when said second coupling is filled with working fluid, and a clutch adapted to be engaged and disengaged and effective to lock up said first-mentioned gearing unit in direct forward drive when engaged, said clutch including a rotatable clutch drum, said second planetary gearing unit having a planet carrier constituting the power delivery member of said gear unit, said clutch drum being connected to each of said planet carriers and connecting said carriers to each other for unitary rotation, said first-mentioned fluid coupling device and said clutch constituting the power train for direct drive of said power output shaft when said clutch is engaged.

4. In a transmission, an engine driven shaft, a power output shaft, first and second hydrodynamic torque transfer units each having an impeller driven by said engine driven shaft and a turbine, a planetary gearing unit having a planet carrier connected to drive said power output shaft, a sun gear driven by one of said turbines and a reaction ring gear; a second planetary gearing unit having a planet carrier connected to drive said power output shaft, a ring gear connected to the other of said turbines, and a reaction sun gear; a friction clutch selectively operable to lock-up said first planetary gearing unit, said clutch including a rotatable clutch drum, means including said clutch drum for connecting said planet carriers to each other for rotation as a unit, said second hydrodynamic torque transfer device being capable of being filled with working fluid and being emptied of working fluid, said first hydrodynamic torque transfer unit being effective to transmit torque from said engine shaft to said output shaft through said first-mentioned gear unit when said second hydrodynamic torque transfer unit is empty of liquid and said clutch is released, said second hydrodynamic torque transfer device being effective to transmit torque from said engine driven shaft to said output shaft through said second gear unit when said device is filled with fluid and said clutch is released, and said first-mentioned hydrodynamic torque transfer device being effective to transmit torque from said engine shaft to said power output shaft through said clutch when said clutch is engaged.

5. In a transmission, an engine driven shaft, a power output shaft, a first fluid coupling device including an impeller driven by said engine driven shaft and a turbine, first planetary gearing unit including a planet carrier fixed to said power output shaft and supporting a plurality of planet gears in mesh with a sun gear and a ring gear, a drive connection between said turbine and said sun gear, one-way brake means for preventing rotation of said ring gear in one direction and for permitting rotation of said ring gear in the opposite direction, a second fluid coupling device adapted to be filled with and emptied of working fluid including an impeller driven by said engine driven shaft and a turbine, a second planetary gearing unit having a planet carrier connected to drive said power output shaft and supporting a plurality of planet gears in mesh with a sun gear and a ring gear, a drive connection between said last-mentioned turbine and ring gear, one-way brake means for preventing rotation of said last-mentioned sun gear in one direction and permitting rotation of said sun gear in the opposite direction, and a clutch selectively operable to lock said first gear unit sun gear to said first gear unit carrier, said first fluid coupling device and said first gear unit being effective to establish low gear drive ratio when said second coupling device is empty and said clutch is released, said second fluid coupling device and said second gear unit being effective to establish second gear ratio when said second fluid coupling is filled with fluid and said clutch is released, said first fluid coupling unit and said clutch being effective to establish direct drive when said clutch is engaged.

6. The combination set forth in claim 5 including a two-way brake selectively operable to prevent rotation of said first gearing unit ring gear in any direction and a selectively operable two-way brake for preventing rotation of said second gear unit sun gear in either direction.

7. The combination set forth in claim 5 including a releasable brake for rendering said first-mentioned one-way brake ineffective to provide a positive neutral condition of transmission operation.

8. The combination set forth in claim 5 wherein said second gear unit planet carrier is connected to said power output shaft through said first gear unit planet carrier.

9. In a variable speed transmission of the type having a hydrodynamic torque transfer device including an engine driven impeller and a turbine, a final power output shaft, a first gear unit including a planet carrier fixed for rotation with said final power output shaft and supporting a planet gear in mesh with a ring gear and a sun gear, a clutch drum fixed to said planet carrier for rotation therewith, an intermediate shaft for connecting said turbine and said sun gear in drive relationship, a clutch hub fixed for rotation with said intermediate shaft, engageable and releasable friction clutch members in said clutch drum for selectively locking and releasing said clutch drum to and from said intermediate shaft, engageable and releasable brake means effective when engaged to prevent rotation of said ring gear in at least one direction, a second gear unit including a planet carrier supporting a planet gear in mesh with a ring gear and a sun gear, means including said clutch drum for connecting the planet carrier of said second gear unit to said first-mentioned planet carrier in a nonrotatable relationship, brake means for preventing rotation of said second gear unit sun gear in one direction, and clutch means effective to selectively couple said second gear unit ring gear to and to uncouple said second gear unit ring gear from said engine.

10. In a variable speed transmission of the type having a hydrodynamic torque transfer device including an engine driven impeller and a turbine, a final output shaft, a first gear unit including a planet carrier fixed for rotation with said final power output shaft and supporting a planet gear in mesh with a ring gear and a sun gear, a clutch drum fixed to said planet carrier for rotation therewith, an intermediate shaft for connecting said turbine to said sun gear, a clutch hub fixed for rotation with said intermediate shaft, engageable and releasable members in said clutch drum for selectively locking and releasing said sun gear to and from said planet carrier, brake means for preventing rotation of said ring gear in one direction including an engageable and releasable brake and a one-way brake connected in series, an additional engageable and releasable brake effective when engaged to prevent rotation of said ring gear in any direction, a second gear unit including a planet carrier supporting a planet gear in mesh with a ring gear and a sun gear, means including said clutch drum for connecting said second planet carrier to said first planet carrier for rotation therewith, brake means for preventing rotation of said second gear unit sun gear in one direction, additional engageable and releasable brake means effective when engaged to prevent rotation of said second gear unit sun gear in any direction, drive ratio control means for controlling the drive ratio of said second gear unit consisting of a fluid coupling of the type adapted to be alternately filled with and emptied of working fluid, said fluid coupling including a turbine connected to said second gear unit ring gear for rotation therewith and an engine driven impeller.

11. In a variable speed transmission of the type having a hydrodynamic torque transfer unit including a turbine and an engine driven impeller, a final power delivery shaft, a first gear unit including a planet carrier fixed for rotation with said final output shaft and supporting a planet gear in mesh with a ring gear and a sun gear, a second shaft connecting said sun gear to said turbine for rotation therewith, a clutch hub fixed to said second shaft, a clutch drum fixed to said planet carrier for rotation therewith, engageable and releasable clutch plates in said clutch drum effective when engaged to lock said planet carrier to said turbine driven shaft, brake means for preventing rotation of said ring gear in at least one direction, a second planetary gearing unit including a planet carrier supporting a planet gear in mesh with a ring gear and a sun gear, means connecting said second gear unit carrier to said clutch drum for unitary rotation with said clutch drum and said first gear unit carrier, means for preventing rotation of said second gear unit sun gear in at least one direction, a second hydrodynamic torque transmitting device of the type adapted to be selectively filled with and emptied of working fluid and including a turbine and an engine driven impeller, and a drive connection between said last-mentioned turbine and said second gear unit ring gear, said transmission being effective to transmit torque from said first-mentioned turbine through reduction drive of said first gear unit when said clutch is released and said second-mentioned hydrodynamic torque transfer device is empty of working fluid, said transmission being effective to transmit torque through said second-mentioned turbine and in reduction drive of said second gear unit when said clutch is engaged and said second-mentioned hydrodynamic torque transfer device is filled with working fluid, said transmission being effective to transmit torque through both of said turbines and in direct drive when said clutch is engaged and said second hydrodynamic torque transfer device is filled with working fluid.

12. In a variable speed transmission of the type having a hydrodynamic torque transfer device including an engine driven impeller and a turbine, a final output shaft, a first gear unit including a planet carrier fixed for rotation with said final output shaft and supporting a planet gear in mesh with a ring gear and a sun gear, a rotatable clutch drum fixed to said planet carrier for rotation therewith, means for connecting said sun gear to said turbine for rotation therewith, a clutch hub fixed for rotation with said sun gear, engageable and releasable friction clutch members carried by said clutch hub and said clutch drum for selectively locking and releasing said clutch drum to and from said sun gear, brake means for preventing rotation of said ring gear in at least one direction, a second gear unit including a planet carrier connected to said first gear unit planet carrier by said clutch drum for rotation therewith and supporting a planet gear in mesh with a ring gear and a sun gear, means for preventing rotation of said second gear unit sun gear in at least one direction, clutch means effective to selectively couple said second gear unit ring gear to and to uncouple said second gear unit ring gear from said engine, a third gear unit including a planet carrier fixed for rotation with said final power output shaft and supporting a planet gear in mesh with a ring gear and a sun gear, means connecting the sun gear of said third gear unit to the ring gear of said first gear unit for rotation therewith, and selectively operable brake means effective when engaged to brake said third gear unit ring gear against rotation.

13. In a variable speed transmission of the type having a hydrodynamic torque transfer device including an engine driven impeller and a turbine, a final output shaft, a first gear unit including a planet carrier fixed for rotation with said final output shaft and supporting a plurality of planet pinions in mesh with a sun gear and a ring gear, a clutch drum fixed for rotation with said planet carrier, means connecting said turbine to said sun gear for rotation therewith, a clutch hub fixed for rotation with said sun gear, engageable and releasable clutch plates carried by said clutch hub and said drum for selectively locking said clutch drum to and releasing said clutch drum from said sun gear, brake means for preventing rotation of said ring gear in one direction including an engageable and releasable two-way brake and a one-way brake connected in series, an additional engageable and releasable brake effective when engaged to prevent rotation of said ring gear in any direction, a second gear unit including a planet carrier supporting a plurality of planet gears in mesh with a ring gear and a sun gear, means including said clutch drum and said first gear unit planet carrier for connecting said second gear unit carrier to said final output shaft for rotation therewith, means including a one-way brake for preventing rotation of said second gear unit sun gear in one direction, an additional engageable and releasable brake effective when engaged to prevent rotation of said second gear unit sun gear in any direction, means for controlling the drive ratio of said second gear unit comprising a fluid coupling unit of the type adapted to be alternately filled with and emptied of working fluid, said fluid coupling unit including a turbine fixed for rotation with said second gear unit ring gear and an engine driven impeller, a third gear unit including a planet carrier fixed for rotation with said final output shaft and supporting a plurality of planet gears in mesh with a ring gear and a sun gear, means connecting said third gear unit sun gear to said first gear unit ring gear for rotation therewith, and an engageable and releasable brake effective when engaged to brake said third gear unit ring gear against rotation.

References Cited in the file of this patent

UNITED STATES PATENTS

| | | |
|---|---|---|
| 2,312,849 | Pollard | Mar. 2, 1943 |
| 2,687,657 | Kugel et al. | Aug. 31, 1954 |
| 2,749,777 | Simpson | June 12, 1956 |
| 2,851,906 | De Lorean | Sept. 16, 1958 |
| 2,876,656 | Herndon | Mar. 10, 1959 |